(12) United States Patent
Hopperstad

(10) Patent No.: US 8,687,462 B2
(45) Date of Patent: Apr. 1, 2014

(54) POSITION DETERMINATION OF A SEISMIC SOURCE ARRAY

(75) Inventor: Jon-Fredrik Hopperstad, Cambridge (GB)

(73) Assignee: WesternGeco L.L.C., Houston, TX (US)

( * ) Notice: Subject to any disclaimer, the term of this patent is extended or adjusted under 35 U.S.C. 154(b) by 515 days.

(21) Appl. No.: 12/988,863

(22) PCT Filed: May 12, 2009

(86) PCT No.: PCT/GB2009/001164
§ 371 (c)(1),
(2), (4) Date: Jan. 24, 2011

(87) PCT Pub. No.: WO2009/150395
PCT Pub. Date: Dec. 17, 2009

(65) Prior Publication Data
US 2011/0122724 A1    May 26, 2011

(30) Foreign Application Priority Data
Jun. 13, 2008 (GB) .................... 0810882.1

(51) Int. Cl.
*G01V 1/38* (2006.01)
*G01S 15/00* (2006.01)
*G01V 1/00* (2006.01)

(52) U.S. Cl.
USPC ............. 367/19; 367/14; 367/99; 367/100

(58) Field of Classification Search
USPC ............. 367/23, 19, 144; 181/111, 113
See application file for complete search history.

(56) References Cited

U.S. PATENT DOCUMENTS

| 4,476,553 A | 10/1984 | Ziolkowski et al. |
| 4,658,384 A * | 4/1987 | Dragoset et al. ............. 367/23 |
| 6,018,494 A | 1/2000 | Laws |
| 6,788,618 B2 * | 9/2004 | Clayton et al. ............... 367/13 |
| 7,376,045 B2 * | 5/2008 | Falkenberg et al. ......... 367/19 |
| 8,004,930 B2 | 8/2011 | Welker et al. |
| 2005/0259513 A1 | 11/2005 | Parkes |
| 2007/0230268 A1 | 10/2007 | Hoogeveen et al. |
| 2009/0231953 A1 | 9/2009 | Welker et al. |
| 2011/0122725 A1 | 5/2011 | Hopperstad |

FOREIGN PATENT DOCUMENTS

| GB | 2320327 A | 6/1998 |
| GB | 2433594 A | 6/2007 |
| GB | 2436699 A | 10/2007 |

OTHER PUBLICATIONS

Landrø: "Source signature determination by inversion of ministreamer data", The Leading Edge, Jan. 2000, pp. 46-49.

(Continued)

*Primary Examiner* — Isam Alsomiri
*Assistant Examiner* — Hovhannes Baghdasaryan

(57) ABSTRACT

A method of obtaining information about the positions of sources in a marine seismic source array that has N seismic sources, including at least $N_{unique}$ types of sources that are nominally non-identical to one another, where $1 \leq N_{unique} \leq N-1$. The method comprises measuring the pressure field at M independent locations of the N sources, where $M > N_{unique}$, and obtaining information about the positions of sources from the M pressure measurements and from the constraint that at least two of the sources are nominally identical to one another.

12 Claims, 10 Drawing Sheets

(56) References Cited

OTHER PUBLICATIONS

Laws et al: "An experimental comparison of three direct methods of marine source signature estimation", Geophysical Prospecting, vol. 46, 1998, pp. 353-389.

Parkes et al: "The signature of an air gun array: Computation from near-field measurements including interactions—Practical considerations", Geophysics, vol. 48, No. 2, 1984, pp. 105-111.

Vaage et al: "Interaction between airguns", Geophysical Prospecting, vol. 32, 1984, pp. 676-689.

Ziolkowski et al: "The signature of an air gun array: Computation from near-field measurements including interactions", Geophysics, vol. 47, No. 10, 1982, pp. 1413-1421.

Combined Search and Examination Report of British Application No. GB 0810828.4 dated Oct. 8, 2008.

Combined Search and Examination Report of British Application No. GB 0810882.1 dated Oct. 6, 2008.

International Search Report of PCT Application No. PCT/GB2009/001165 dated Nov. 26, 2010.

International Search Report of PCT Application No. PCT/GB2009/001164 dated Sep. 23, 2009.

\* cited by examiner

POSITION DETERMINATION OF A SEISMIC SOURCE ARRAY

The present invention relates to seismic surveying. In particular, it relates to a method of and system for determining the positions of seismic sources in a seismic source array.

The general principle of seismic surveying is that one or more sources of seismic energy are caused to emit seismic energy such that it propagates downwardly through the earth. The downwardly-propagating seismic energy is reflected by one or more geological structures within the earth that act as partial reflectors of seismic energy. The reflected seismic energy is detected by one or more sensors (generally referred to as "receivers"). It is possible to obtain information about the geological structure of the earth from seismic energy that undergoes reflection within the earth and is subsequently acquired at the receivers.

A typical seismic survey uses a source array containing two or more seismic sources. When a source array is actuated to emit seismic energy it emits seismic energy over a defined period of time. The emitted seismic energy from a seismic source array is not at a single frequency but contains components over a range of frequencies. The amplitude of the emitted seismic energy is not constant over the emitted frequency range, but is frequency dependent. The seismic wavefield emitted by a seismic source array is known as the "signature" of the source array. When seismic data are processed, knowledge of the signature of the seismic source array used is desirable, since this allows more accurate identification of events in the seismic data that arise from geological structures within the earth. In simple mathematical terms, the seismic wavefield acquired at a receiver represent the effect of applying a model representing the earth's structure to the seismic wavefield emitted by the source array; the more accurate is the knowledge of the source array signature, the more accurately the earth model may be recovered from the acquired seismic data.

It has been suggested that one or more sensors may be positioned close to a seismic source, in order to record the source signature. By positioning the sensor(s) close to the seismic source the wavefield acquired by the sensor(s) should be a reliable measurement of the emitted source wavefield. WesternGeco's™ Trisor/CMS system provides estimates of the source wavefield from measurements with near-field hydrophones near each of the seismic sources composing the source arrays in marine seismic surveys.

FIG. 1(a) is a schematic perspective view of a marine seismic source array having 18 airgun positions A1 . . . A18 (for clarity, not all airgun positions are labelled). In use, an airgun or a cluster of two or more airguns is located at each airgun position—FIG. 1 shows, for illustration, a single airgun 1 at each of airgun locations A2 to A6, A8 to A12 and A14 to A18 and a cluster 2 of three airguns at positions A1, A7 and A13. A near-field hydrophone is located above each airgun position to record the emitted wavefield-hydrophones H1 to H6 located above airgun positions A1 to A6 are labelled in FIG. 1(b), which is a side view of one sub-array.

FIG. 1(a) illustrates a further feature of seismic source arrays, which is that they are often comprised of two or more sub-arrays. The source array shown in FIG. 1(a) comprises three identical sub-arrays, with airgun positions A1-A6 constituting one sub-array, airgun positions A7-A12 constituting a second sub-array and airgun positions A13-A18 constituting a third sub-array. The sources of a sub-array are suspended from a respective surface float F1, F2, F3. Each sub-array is towed from a seismic vessel using a high-pressure gun-cable (not shown), which supplies the sub-array with high-pressure air for the airguns. The gun-cable also has optical fibres and power lines for the in-sea electronics in the source array.

The signature of a seismic source array is generally directional, even though the individual sources may behave as "point sources" that emit a wavefield that this spherically symmetrical. This is a consequence of the seismic source array generally having dimensions that are comparable to the wavelength of sound generated by the array.

The signature of a seismic source array further varies with distance from the array. This is described with reference to FIG. 2. An array of sources 3, in this example a marine source array positioned at a shallow depth below a water-surface 4, emits seismic energy denoted as arrows 5. In FIG. 2 a "near field" region 6 is shown bounded by a boundary 7 with a "far field" region 8 on the other side of the boundary. In the near field region 6 the shape of the near field signature from the array of seismic sources varies with distance from the array. At the notional boundary 7, however, the signature of the array may assume a stable form. In the far-field region 8, the far-field signature of the array maintains a constant shape, and the amplitude of the signature decreases at a rate that is inversely proportional to the distance from the source array. The notional boundary 7 separating the near field region 6 from the far-field region 8 is located at a distance from the source array approximately given by $D^2/\lambda$, where D is the dimension of the array and $\lambda$ is the wavelength.

In processing geophysical data, knowledge of the far-field signature of the source array is desirable, since most geological features of interest are located in the far-field region 8. Direct measurement of the far-field signature of the array is difficult, however, owing to the need to ensure that no reflected energy is received during measurement of the far-field signature.

The near-field signature of an individual seismic source may in principle be measured, for example in laboratory tests or in field experiments. However, knowledge of the source signatures of individual seismic sources is not sufficient to enable the far-field signature of a source array to be determined, since the sources of an array do not behave independently from one another.

Interactions between the individual sources of a seismic source array were considered in U.S. Pat. No. 4,476,553. The analysis specifically considered airguns, which are the most common seismic source used in marine surveying, although the principles apply to all marine seismic sources. An airgun has a chamber which, in use, is charged with air at a high pressure and is then opened. The escaping air generates a bubble which rapidly expands and then oscillates in size, with the oscillating bubble acting as a generator of a seismic wave. In the model of operation of a single airgun it is assumed that the hydrostatic pressure of the water surrounding the bubble is constant, and this is a reasonable assumption since the movement of the bubble towards the surface of the water is very slow. If a second airgun is discharged in the vicinity of a first airgun, however, it can no longer be assumed that the pressure surrounding the bubble generated by the first airgun is constant since the bubble generated by the first airgun will experience a seismic wave generated by the second airgun (and vice versa).

U.S. Pat. No. 4,476,553 proposed that, in the case of seismic source array containing two or more seismic sources, each seismic source could be represented by a notional near-field signature. In the example above of an array of two airguns, the pressure variations caused by the second airgun is absorbed into the notional signature of the first airgun, and vice versa, and the two airguns may be represented as two independent airguns having their respective notional signatures. The far field signature of the array may then be found, at any desired point, from the notional signatures of the two airguns.

In general terms U.S. Pat. No. 4,476,553, the contents of which are hereby incorporated by reference, discloses a method for calculating the respective notional signatures for the individual seismic sources in an array of n sources, from measurements of the near-field wavefield made at n independent locations. When applied to the source array of FIG. 1, for example, measurements of the near field wavefield at each of the 18 hydrophone locations would allow the notional signatures for the 18 sources/clusters located at airgun positions A1 to A18 to be determined. The required inputs for the method of U.S. Pat. No. 4,476,553 are:

measurements of the near-field wavefield at n independent locations;

the sensitivities of the n near-field sensors used to obtain the n measurements of the near-field wavefield; and the (relative) positions of the n sources and the n near-field sensors.

For the simple source array containing two seismic sources 9,10 shown in FIG. 3, notional signatures for the two sources may be calculated according to the method of U.S. Pat. No. 4,476,553 from measurements made by near-field sensors 11,12 at two independent location from the distances $a_{11}$, $a_{12}$ between the location of the first near-field measuring sensor 12 and the seismic sources 9, 10, from the distances $a_{21}$, $a_{22}$ between the location of the second near-field sensor 11 and the seismic sources 9, 10, and from the sensitivities of the two near-field sensors. (In some source arrays the near-field sensors are rigidly mounted with respect to their respective sources, so that the distances $a_{11}$ and $a_{22}$ are known.) Once the notional signatures have been calculated, they may be used to determine the signature of the source array at a third location 12, provided that the distances $a_{31}$, $a_{32}$ between the third location and the seismic sources 9, 10 are known.

If a source array is not rigid it is necessary to obtain information about the positions of the seismic sources within the array before the method of U.S. Pat. No. 4,476,553 may be used. (For example, if the source array of FIG. 3 is not rigid the distances $a_{12}$, $a_{21}$ are not fixed and so must be determined.) This may be done by providing an external system for monitoring the positions of the sources in an array, for example by mounting Global Positioning System ("GPS") receivers on the source sub-arrays (or on the sources), or by mounting GPS receivers on the floats and placing depth sensors on the sources. FIG. 1(a) shows two GPS antennas G on each surface float F1-F3. This is not completely satisfactory however, as a failure of a GPS receiver or depth sensor will lead to the loss of position information making it impossible to apply the method of U.S. Pat. No. 4,476,553, so leading to interruption of the survey until a repair or replacement can be effected.

Determination of a notional source according to the method of U.S. Pat. No. 4,476,553 ignores the effect of any component of the wavefield reflected from the sea bed and so is limited to application in deep water seismography. The method of U.S. Pat. No. 4,476,553 has been extended in GB Patent No. 2 433 594 to use "virtual sources" so as to take account of reflections at the sea-surface or at the sea bottom.

In principle it would be possible to use the near-field sensors to obtain information about the position of the seismic sources and receivers. For example, information about the positions of the sources of one sub-array of the source array of FIG. 1 relative to the sources of one sub-array may be obtained by determining the time between actuation of a seismic source of one sub-array and the first arrival or "first break") of seismic energy at a near-field sensor on another sub-array. When multiple airguns fire simultaneously it is however very difficult to identify the contributions from different sources in the wavefield measured at a near-field sensor, since airgun signatures are far from orthogonal, and the prior art has been limited to firing one airgun at the time (also known as "single pops") and estimating the propagation time from first break detection. Consequently, the prior art has been limited to sequential firing of the airguns in the array or using an external position-monitoring system.

A first aspect of the present invention provides a method of obtaining information about the positions of sources in a marine seismic source array comprising N seismic sources, wherein the source array includes at least $N_{unique}$ types of sources that are nominally non-identical to one another, where $1 \leq N_{unique} \leq N-1$, the method comprises measuring the pressure field at M independent locations of the N sources, where $M > N_{unique}$, and obtaining information about the positions of sources from the M pressure measurements and from the constraint that at least two of the sources are nominally identical to one another.

M may be less than, equal to, or greater than N.

Obtaining information about the positions of sources may comprise solving a set of $N_{unique}$ equations.

Obtaining information about the positions of sources may comprise determining, on the basis of a first set of estimates of the positions of the seismic sources, respective notional signatures for at least first and second sources that are nominally identical to one another from the M measurements of the pressure field. It may further comprise comparing the notional signature of the first source with the notional signature of the second source.

Two seismic sources that are nominally identical—for example identical airguns that are charged to the same pressure—and that are deployed at the same depth should have notional signatures that are approximately identical to one another. Thus, if the notional signature calculated for the first source differs significantly from the notional signature calculated for the second source, this indicates that one or other of the calculated notional signatures is incorrect and this, in turn, indicates that the first set of estimates of the positions of the seismic sources is incorrect. The method may be repeated until a set of estimates of the positions of the seismic sources is found for which the notional signature calculated for the first source is the same as the notional signature calculated for the second source (or for which the difference between the notional signature calculated for the first source and the notional signature calculated for the second source is sufficiently small).

The invention thus enables the positions of the sources of the array to be determined without need for an external position measurement system. The invention may be applied in the case of simultaneous actuation of the sources of the array, thereby overcoming the limitation to sequential actuation of the sources required by prior art methods.

The method may further comprise generating an output at one or more of the sources of the array; and measuring the pressure field at the M independent locations.

The notional signatures may, for example, be calculated according to the method of U.S. Pat. No. 4,476,553 or GB Patent No. 2 433 594.

In an embodiment in which the sources are airguns, comparing the notional signature of the first source with the notional signature of the second source may comprise comparing the notional signature of the first source with the notional signature of the second source within a time window that excludes the first bubble peak of the notional signature of the first source and the first bubble peak of the notional signature of the second source.

As noted, a method of the present invention is based on the assumption that two seismic sources that are nominally identical, for example identical airguns that are charged to the same pressure, and that are deployed at the same depth should have notional signatures that are identical to one another. The validity of this assumption may be compromised by the potential asymmetry of the acoustic pressure field in which the bubbles of identical airguns interact. It is well-known that acoustic interaction affects both the period and amplitude of the notional source pressure (see for example Vaage et al. "Interaction between airguns", Geophysical Prospecting, 32, 676-689 (1984)). However, modelling of standard (asymmetrical) source arrays show this effect to be negligible when evaluated in a time window shorter than the bubble period. Consequently, it is preferred that the difference between the notional signature of the first source and the notional signature of the second source is evaluated in a time window including the primary pressure peak, but excluding the first bubble peak.

The method may comprise the further step of generating a measure (or "cost function") indicative of a difference between the notional signature of the first source and the notional signature of the second source. This measure may then be compared with a predetermined threshold, to provide a simple way of determining whether the difference between the notional signature of the first source and the notional signature of the second source is acceptably small. An example of a suitable measure of the normalised RMS (root-mean-square) difference between two notional source signatures, or NRMS. If the generated measure is less than the predetermined threshold, this may be taken as an indication that the first set of estimates of the positions of the seismic sources represents an acceptable estimate of the true positions of the seismic sources. This in turn indicates that notional signatures of seismic sources of the array generated using the first set of estimates of the positions of the seismic sources are, or are close to, the true notional signatures.

Alternatively, the generated measure indicative of the difference between the notional signature of the first source and the notional signature of the second source may be greater than the predetermined threshold. This indicates that the first set of estimates of the positions of the seismic sources is not an acceptable estimate of the true positions of the seismic sources. In this case, the method may be repeated for a second set of estimates of the positions of the seismic sources different from the first set of estimates of the positions of the seismic sources, to determine whether the second set of estimates is an acceptable representation of the true positions of the seismic sources. If the second set of estimates of the positions of the seismic sources is found not to be an acceptable estimate of the true positions of the seismic sources the method is repeated for further sets of estimates of the positions of the seismic sources, until an acceptable set of estimates is found (e.g., until a set of estimates is found for which the generated measure indicative of the difference between the notional signature of the first source and the notional signature of the second source is less than the predetermined threshold).

Other preferred features of the invention are set out in the dependent claims.

Other aspects of the invention provide a corresponding computer-readable medium and apparatus.

Preferred embodiments of the present invention will be described by way of illustrative example, with reference to the accompanying figures in which.

Figure 1A:
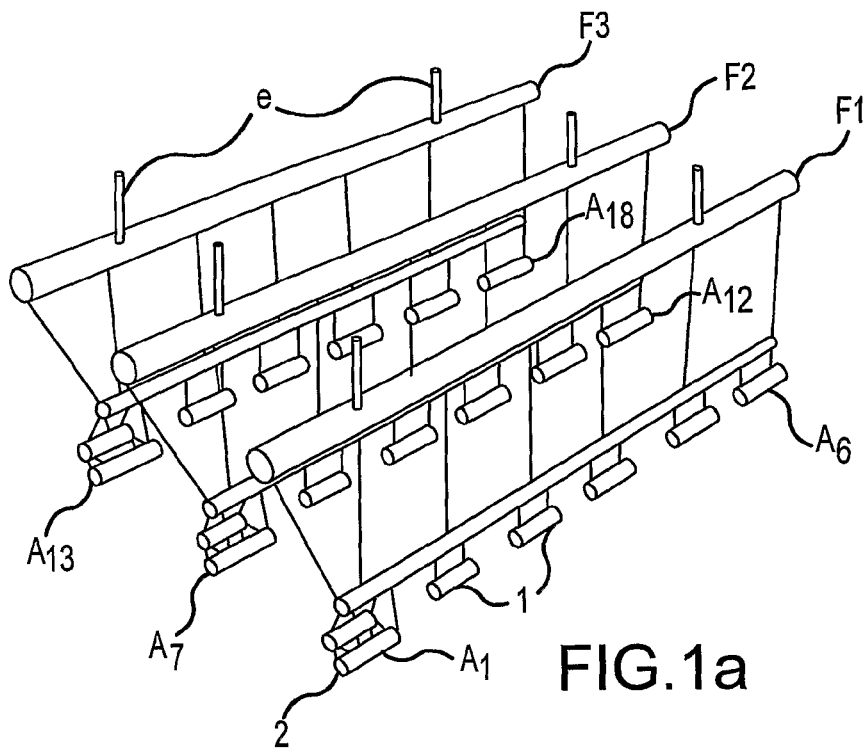
FIG. 1(a) is a schematic view of a marine seismic source array having three sub-arrays.
Figure 1B:
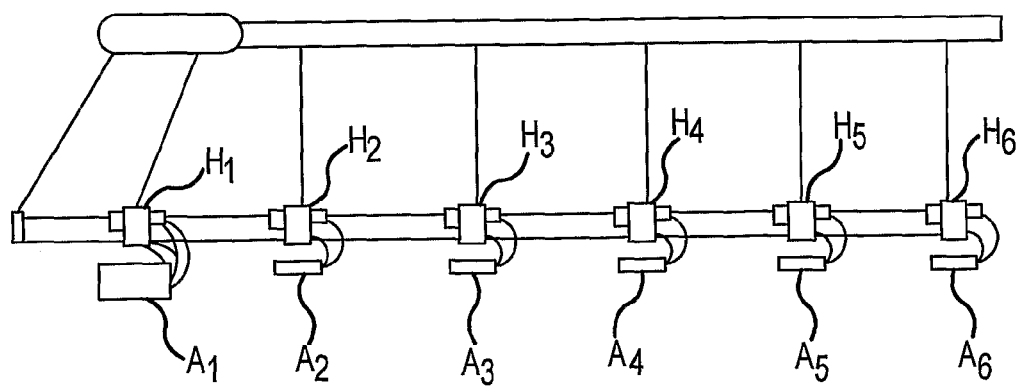
FIG. 1(b) is a side view of one sub-array of the marine seismic source array of FIG. 1(a)
Figure 2:
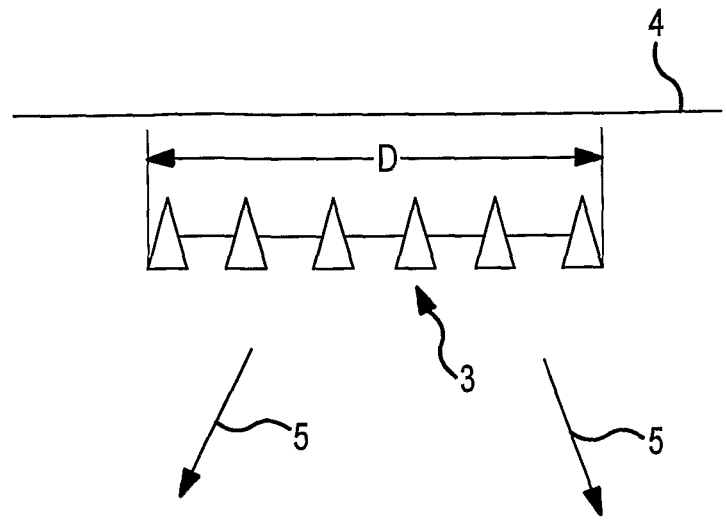
FIG. 2 illustrates propagation of a signature from an array of seismic sources.
Figure 2:
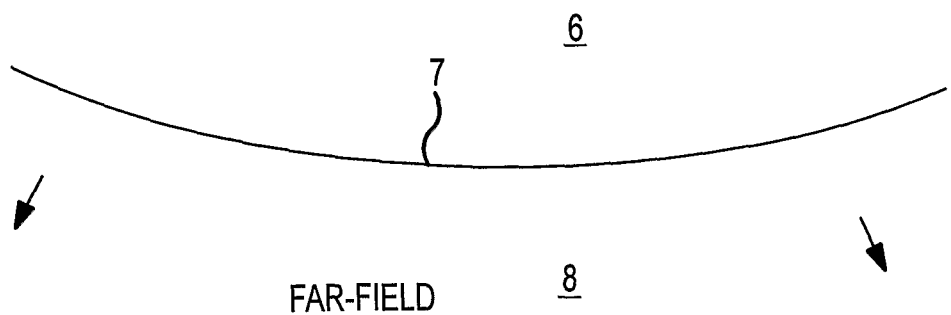
Figure 3:
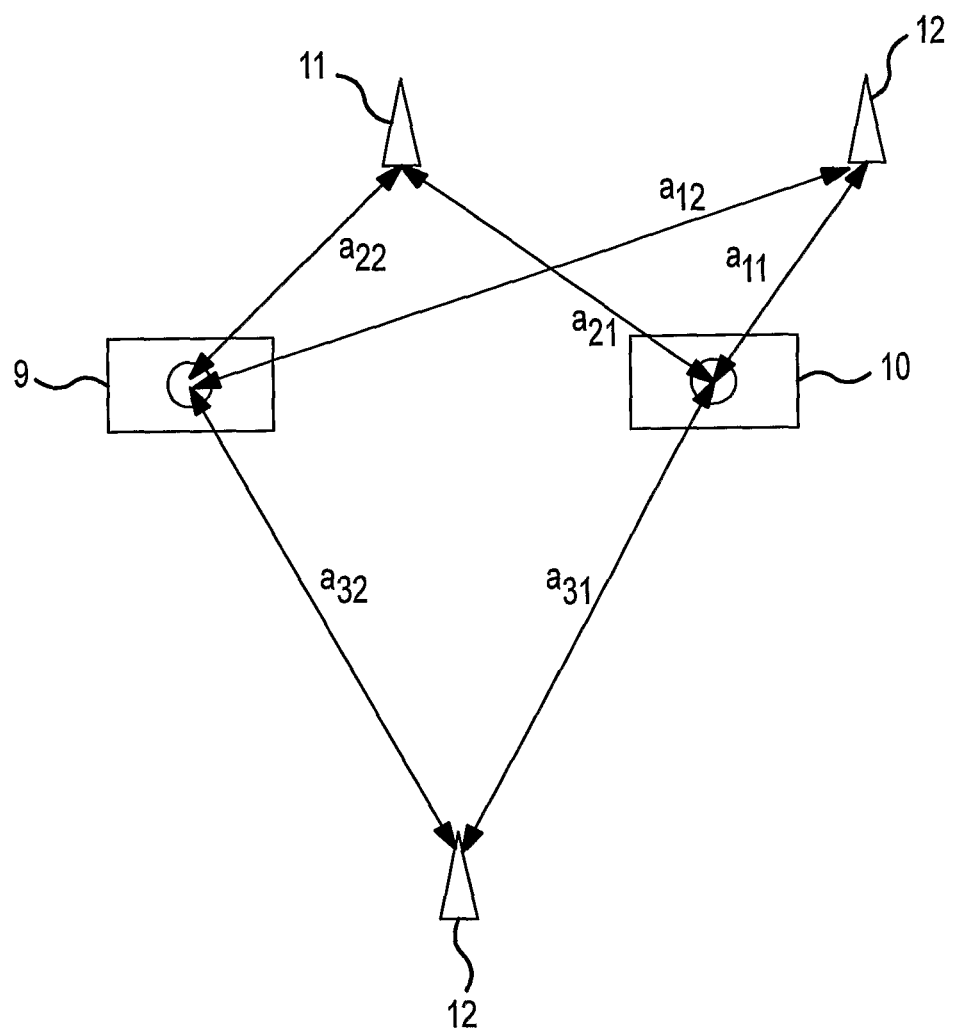
FIG. 3 illustrates determination of a notional signature for an array of seismic sources.
Figure 4B:
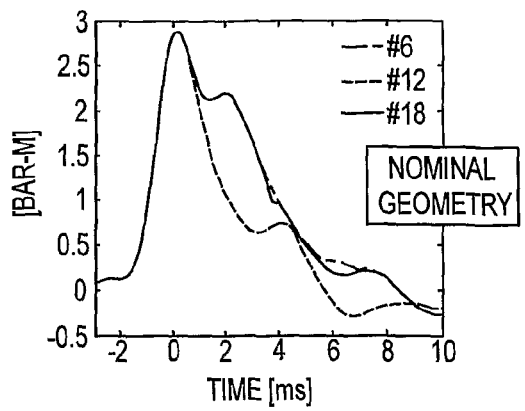
FIG. 4(b) shows notional signatures calculated for some sources of the array of FIG. 4(a) for the intended positions of the sources.
Figure 4A:
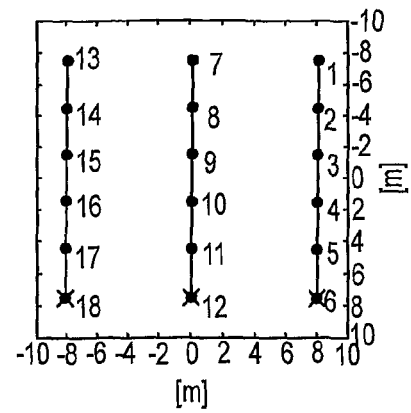
FIG. 4(a) is a schematic plan view of an array of seismic sources showing intended positions of the seismic sources.

In the above referenced figures, FIG. 4(a) is a plan view showing the nominal positions (that is, the intended positions) of the sources of the seismic source array shown in FIG. 1(a). As can be seen, it is intended that the three sub-arrays should be parallel to one another and level with one another, with the spacing between any two neighbouring sub-arrays being the same. The array is towed in a direction parallel to the length of the sub-arrays.

In a typical seismic survey, however, the positions of the sub-arrays are perturbed owing to the action of, for example, tide, wind or currents, so that the actual positions of the sources differ from their nominal positions. FIG. 5(a) show a typical example of the actual positions of the seismic sources of the seismic source array shown in FIG. 1(a) as might occur when the source array is deployed. As can be seen, the sub-arrays are no longer parallel to one another, the sub-arrays are not level with one another, and the spacing between neighbouring sub-arrays differs. If it is desired to calculate the notional signatures of the seismic sources (for example according to the method of U.S. Pat. No. 4,476,553 or GB Patent No. 2 433 594), to enable the far-field signature of the array to be estimated, it is therefore not safe to assume that the seismic sources are positioned at their notional positions and it is necessary to estimate the actual positions of the seismic sources. As explained above, this has hitherto been done by providing an external measuring system.

The present invention may be applied to any source array in which two of the seismic sources are nominally identical to one another. By "nominally identical" is meant that the sources are identical apart from inevitable variations in the manufacturing process. Also, the two sources are required to be operated in a nominally identical way so that, in the case of airgun sources for example, the airguns must be charged to the same nominal operating pressure. It should be noted however that exact identicality is not required, and the invention may be applied with two sources whose signature difference is smaller than the errors caused by processing the signatures using incorrect positions for the sources of the source array.

The invention makes use of the fact that, if two nominally identical sources are deployed at the same depth, they should have the same nominal signatures. The method of U.S. Pat. No. 4,476,553 provides a system of n equations for the notional signatures of n seismic sources, and requires measurement of the pressure wavefield at n independent location. However if two or more of the sources are identical, the set of n equations becomes over-determined. This makes it possible to scan for the source array geometry that minimises the difference between the calculated notional signatures of two sources that are assumed to be identical. The "source geometry" is a set of 3-D locations for each source position of the array.

Figure 5B:
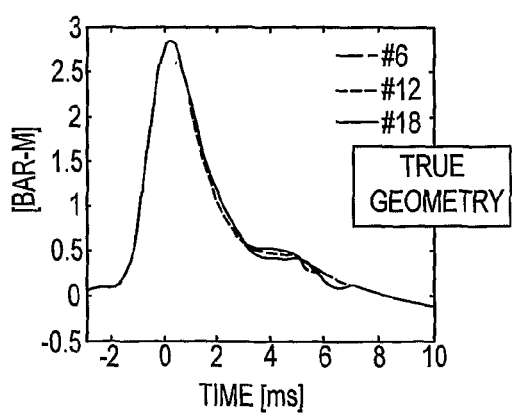
FIG. 5(b) shows notional signatures calculated for some of the sources of the array of FIG. 4(a) on the basis of the actual source positions shown in FIG. 5(a)
Figure 5A:
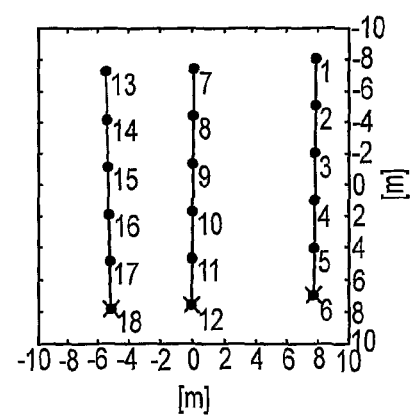
FIG. 5(a) is a schematic plan view showing actual positions of the seismic sources of the array of FIG. 4(a)

Results of the invention are shown in FIGS. 4(b) and 5(b). The seismic sources of the array are actuated at a time when the sources are positioned as shown in FIG. 5(a), and near-field measurements of the pressure wavefield are obtained. The notional signatures of the sources are then calculated, for example using the method of U.S. Pat. No. 4,476,553 or GB Patent No. 2 433 594. According to the invention, the calculation of the notional signatures is made on the basis of a first set of estimates for the 3-D positions of the seismic sources. For example, the first set of estimates for the 3-D positions of the seismic sources may be that the sources are all at their notional positions as shown in FIG. 4(a).

FIG. 4(b) shows the notional signatures calculated for three of the sources in the source array, for the sources at positions 6, 12 and 18, on the assumption that the sources are positioned as shown in FIG. 4(a) so that each source is at its intended position. In this example the sources at positions 6, 12 and 18 are nominally identical to one another, and so should have the same notional signature. However, FIG. 4(b) shows that the notional signature calculated for the source at position 6 differs significantly from the notional signatures calculated for the sources at positions 12 and 18, and also shows that the notional signature calculated for the source at position 12 differs significantly from the notional signature calculated for the source at positions 18. This indicates that the estimate of the source positions is not correct—as is indeed the case, since the actual source positions of FIG. 5(a) differ significantly from the notional source positions of FIG. 4(a).

FIG. 5(b) shows the notional signatures calculated for the sources at positions 6, 12 and 18, on the assumption that the sources are positioned as shown in FIG. 5(a). It can be seen that when the notional signatures calculated for the correct source geometry, the notional signatures calculated for the sources at positions 6, 12 and 18 are very similar to one another, as should be the case. The three notional signatures are in very good agreement over the entire time period from 0 to 10 ms, with only slight differences present.

According to the invention, therefore, the notional signatures are calculated for one or more sets of estimates for the 3-D positions of the seismic sources, until a set of estimates of the source positions is found that yields notional signatures for two nominally identical sources that are identical, or that differ by an acceptable amount. This set of estimates is accepted as being an acceptable estimate to the actual positions of the sources, and the notional signatures for the sources calculated using this set of estimates of the positions of the sources are accepted as acceptable estimates of the notional signatures of the sources. The far-field signature at any desired point in the far-field region may then be obtained from the notional signatures calculated using this set of estimates of the positions of the sources, and may be used in processing seismic data obtained using the seismic source array.

The present invention thus enables the notional signatures to be obtained without the need for an external position measuring system for measuring the positions of the sources of the source array.

Alternatively, the present invention may also be used for a source array that is provided with an external position determination system; this allows the position information obtained by the invention to be combined with the position information from the external position determination system, such that the combined position information gives increased accuracy than either method by itself. For example, the invention may be applied with a source array having an acoustical positioning system, for example the IRMA acoustical positioning system of WesternGeco™, deployed on the source array, together with a GPS system provided on the source floats. The information from the acoustical positioning system, from the GPS and from the method of the invention may all be combined to provide an estimate of the source array geometry. As well as allowing a more accurate estimate of the source geometry to be obtained, if the external position determination system should fail the survey may be continued using just the position information obtained from the method of the invention.

Figure 6:
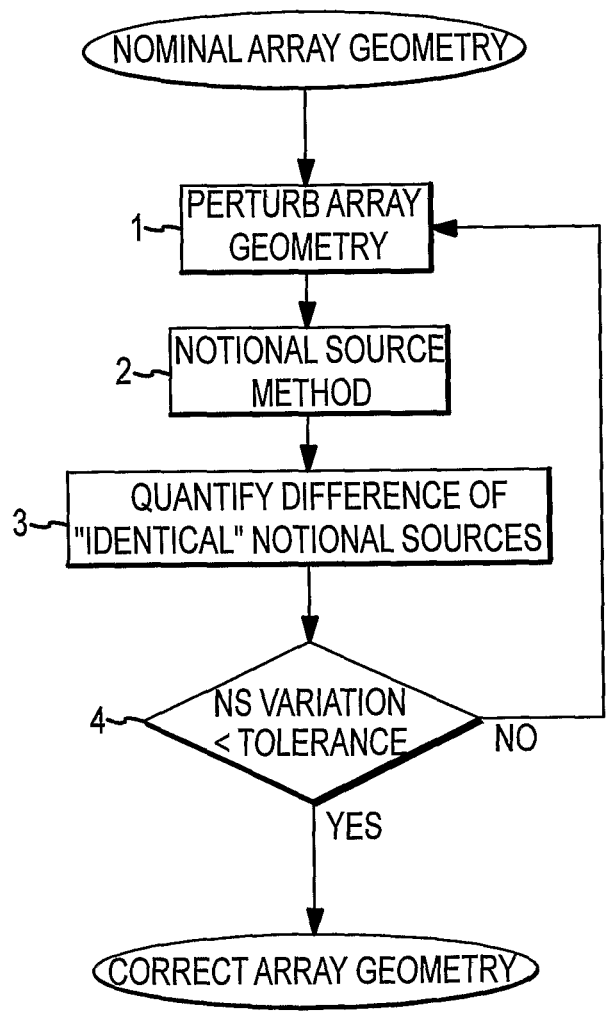
FIG. 6 is a block schematic flow diagram showing principal steps of a method according to one embodiment of the present invention.

FIG. 6 is a block flow diagram showing the principal steps, of a method of the present invention. It is assumed that a seismic source array, for example the source array of FIG. 1(a) has been actuated so that the sources of the array simultaneously emit a seismic wavefield, and that data have been acquired by near-field sensors at N independent locations (where the source array contains N sources), and that seismic data have also been acquired by a receiver array. It is also assumed that the source array contains two (or more) sources that are nominally identical to one another and that are deployed at the same depth.

The method may include the step of actuating the seismic source array so that the sources of the array simultaneously emit a seismic wavefield, sensing the emitted wavefields using the near-field sensors, and acquiring seismic data at a receiver array. Alternatively, the method may be performed on pre-existing data, in which case the method would initially comprise retrieving the pre-existing data from storage.

The nominal geometry (ie, the design geometry) of the source array is known.

It will be assumed in the following description that all sources of the source array are actuated to emit seismic energy when the source array is actuated. The invention does not however require this—as is known, the shot pattern of a source array may be varied by selectively actuating some but not all of the sources of the array.

Initially, a first estimate of the actual array geometry, at the time the source array was actuated, is obtained. In the embodiment of FIG. 6, this estimate is obtained by perturbing the nominal geometry of the source array, as step 1. The estimate obtained in step 1 is a first set of estimates for the positions of every source of the array.

The initial estimate may be that all sources are at their nominal positions, i.e. the initial perturbation may be zero.

At step 2, notional signatures for the sources of the array are calculated using the initial estimate of the array geometry. The notional signatures may, for example, be calculated according to the method of U.S. Pat. No. 4,476,553 or GB Patent No. 2 433 594—in which case the required inputs for the calculation of the notional signatures are the N measured values of the near-field wavefield, the estimated locations of the N sources of the array, and the estimated locations of the N near-field sensors. In the case of the source array of FIG. 1(a) in which the near-field hydrophones $H_{11}$ etc are rigidly mounted with respect to their respective receivers, the estimated locations of the N near-field hydrophones may be readily obtained from the estimated locations of their respective sources. Moreover, even if the near-field sensors are not rigidly mounted with respect to the sources, it may still be a good assumption that a near-field sensor is at its intended position relative to its associated source. In the TRISOR/CMS system, for example, the airguns are suspended in chains below the hydrophones. The airguns are quite heavy, so each airgun remains at a substantially constant distance from its associated hydrophone.

At step 3, the notional signatures for two sources of the source array that are nominally identical, and that are deployed at the same depth, are compared with one another. As explained above, the notional signatures for two sources of the source array that are nominally identical, and that are deployed at the same depth should be identical with one another—so any difference between the two calculated notional signatures is indicative of an error in the estimates of the positions of the sources.

Before step 3 is carried out, the method may include the step of aligning the two notional signatures in time, for example so that the primary peak of one of the notional signatures is coincident in time with the primary peak of the other of the notional signatures. This will allow the comparison between the two notional signatures to exclude effects caused by time delays when the sources were actuated. (While a source is triggered with the intention of producing peak output at a particular "aim point time", the time delay between sending the triggering pulse to a source and the actual firing of the source depends on the mechanical properties of the source—so, in practice, a source may not be fired at the correct time to give peak output at the aim point time (although current firing controllers, such as the TRISOR controller of WesternGeco™, attempt to correct for these triggering delays using predictive filtering techniques). The difference between the aim point time of a source and the actual time at which the source provides peak output is known as the "synchronisation error" of the source.)

At step 4, it is determined whether the difference between the notional signatures calculated for the two nominally identical sources of the source array does not exceed an acceptable level. If the result of step 4 is that the difference between the notional signatures does not exceed an acceptable level (this will be referred to as a "positive result"), the estimates of the source positions are accepted as correct estimates of the actual source positions.

If however the result of step 4 is that the difference between the notional signatures exceeds an acceptable level, the estimates of the source positions are not accepted as correct estimates of the actual source positions. In this case another set of estimates of the source positions is chosen, for example by applying a different perturbation to the nominal source geometry. Steps 2, 3 and 4 are then repeated for the second set of estimates of the source positions.

The process of choosing another set of estimates of the source positions and repeating steps 2, 3 for the latest set of estimates of the source positions is repeated until a set of estimates of the source positions is found that gives a positive result—ie, leads to notional signatures for the two nominally identical sources having a difference that does not exceed an acceptable level. The notional signatures calculated using this set of estimates of the source positions may be accepted as reliable estimates of the true notional signatures of the seismic sources.

In a modification of this embodiment, step 4 may comprise finding the estimate of the source positions that minimises the difference between the notional signatures for the two nominally identical sources.

The seismic data acquired by the receiver array consequent to the actuation of the sources may now be processed. The calculated notional signatures of the sources may be used in the processing of the seismic data. For example, the calculated notional signatures of the sources may be used to determine the far-field signature of the source array at one or more points in the far-field region, and the far-field signature of the source array may be used in the processing of the seismic data.

In principle, step 2 may comprise calculating notional signatures for only the sources whose signatures are to be compared with one another at step 3, since only notional signatures for these sources are required for step 3—with calculation of notional signatures for all sources of the source array being deferred until an acceptable estimate of the positions of the sources has been obtained. Depending on the method used to calculate the notional signatures it may however be more convenient to calculate notional signatures for all sources of the source array at each repetition of step 2.

Alternatively, step 2 may comprise solving an over-determined set of simultaneous equations for the N notional sources. Rather than using the method of U.S. Pat. No. 4,476,553 or GB 2 433 594 with only N recordings of the pressure-field of the N notional sources, the accuracy of the N calculated notional sources can be increased by using M measurements of the pressure-field, where M>N, where M is the number of pressure recordings and N is the number of actuated sources. The over-determined equation set enables redundant estimates of the N notional sources, and/or increased accuracy the estimates of the N notional sources. In a preferred embodiment of solving the over-determined equation set, the extra pressure recordings used to make redundant estimates of the notional sources that are deemed identical. This is described in more detail with reference to FIG. 9 below.

In a preferred embodiment of the method, step 3 comprises obtaining a quantitative measure of the difference between the notional signatures for the two sources of the source array that are nominally identical to one another. In an embodiment where this is done, step 4 may then comprise comparing the quantitative measure of the difference obtained at step 3 with a predetermined threshold value.

One possible method of obtaining a quantitative measure of the difference between the notional signatures of two sources is to determine the correlation between the two notional signatures. For example, the normalised root-mean-square difference between the two notional signatures may be calculated over a specified time window, although any suitable cost function that provides a quantitative measure of the difference between the two notional signatures may be used.

Figure 7:
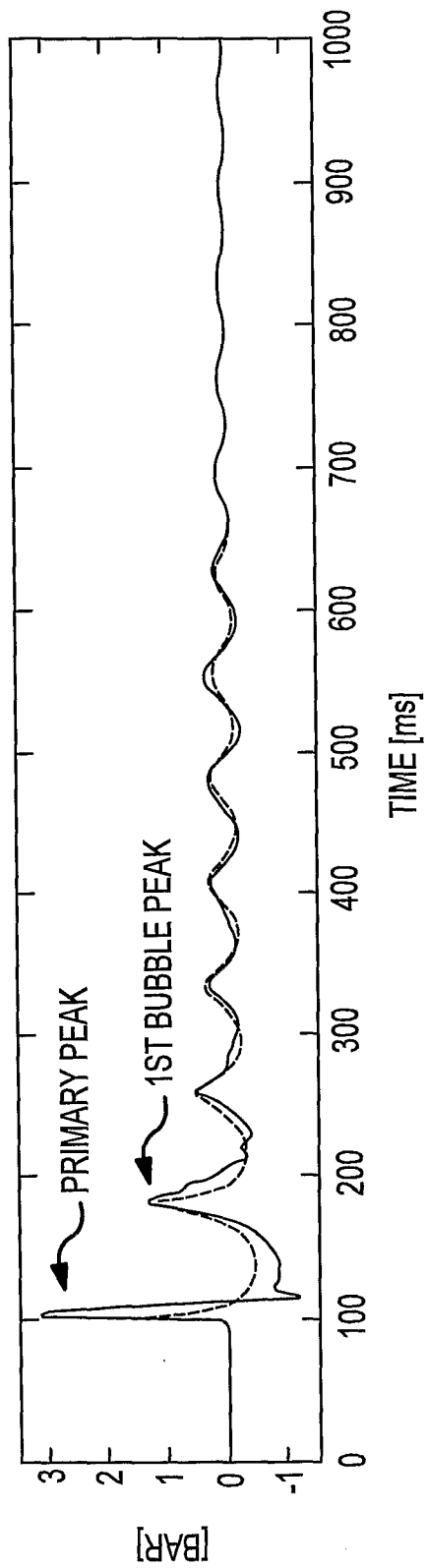
FIG. 7 shows a typical near-field hydrophone measurement and a typical notional signature.

As noted above, a method of the present invention is based on the assumption that two seismic sources that are nominally identical and that are deployed at the same depth should have notional signatures that are identical to one another. The validity of this assumption may be compromised by the potential asymmetry of the acoustic pressure field in which the bubbles of identical airguns interact. FIG. 7 shows (in full line) a typical pressure field that would be sensed by a near-field hydrophone when an array of airguns is actuated. It can be seen that the pressure field includes a "primary peak", followed by a succession of "bubble peaks" which arise from interactions between the pressure fields of different airguns of the array. FIG. 7 also shows, as a broken line, the notional signature that would be calculated for an airgun of this array, and it will be seen that the notional signature again includes a "primary peak", followed by a succession of "bubble peaks". Consequently, it is preferred that, in step 3, the difference between the notional signatures of the two sources is evaluated in a time window that includes the primary pressure peak but that excludes the first bubble peak. For the example of notional signatures having the form shown in FIG. 7, it would be preferred for the difference between the notional signatures of the two sources to evaluated in a time window that extends from approximately 0 to 150 ms, since this excludes the first bubble peak (which occurs at about 180 ms).

In principle, the notional signatures of the sources need be evaluated only for the time window over which the comparison is to be made. In practice, however it is generally preferable to calculate the notional signatures of the sources over a longer time window than will be used for the comparison, to avoid edge effects.

It is possible that a typical source array will contain more than two sources that are nominally identical to one another and that are deployed at the same depth. Where the invention is applied to such a source array, steps 3 and 4 may be carried out for two or more pairs of nominally identical sources. In this embodiment, in order for a set of estimates of the positions of the sources to be accepted requires that step 4 gives a positive result for every pair of nominally identical sources for which steps 3 and 4 are carried out. Comparing the notional signatures for two or more pairs of nominally identical sources should lead to a more reliable result than comparing the notional signatures for only a single pair of nominally identical sources. It is therefore preferred that, if a source array contains more than two nominally identical sources, the method is applied to more than one pair of nominally identical sources, and preferably is applied to all pairs. Further, it is preferred that the method is applied to pairs of nominally identical sources that are disposed at locations across the array, so that the estimate of the source array geometry is not obtained using nominally identical sources in only one part of the array.

Alternatively, where the invention is applied to such a source array that contains more than two sources that are nominally identical to one another and that are deployed at the same depth, step 3 may comprise comparing the notional signatures determined for three or more nominally identical sources. This may be done using, for example, a cost function that is the sum of three (or more) individual cost functions, one for each pair of nominally identical sources and finding a source array geometry that minimises the overall cost function or that gives a value of the cost function that is below a set threshold. In an example where the NRMS difference is used as a cost function, the overall cost function in the case of three nominally identical sources would be the sum of the NRMS values for each pair of nominally identical sources.

Where a source array contains many nominally identical sources, two nominally identical sources that are selected as a pair are preferably selected from sources that are expected to be subject to large geometry perturbations. For example, where the invention is applied to the source array of FIG. 4(a), it is expected that perturbations in position of a source of one sub-array relative to the position of a source on another sub-array will be greater than the perturbations in relative position of two source on the same sub-array—and the pair of nominally identical sources used, or at least one of the pairs of nominally identical sources used, is therefore preferably made up of sources located on two different sub arrays.

The invention requires that the identical source positions are located such that variations in the source array geometry results in non-identical recordings of the corresponding pressure field, i.e., the hydrophone recordings associated with a pair of identical sources must be dissimilar, such that the similarity of the corresponding notional source signatures is a measure of the error in the array geometry that is being tested in the notional source calculation. This is not fulfilled with a source array comprising two mirror-symmetric sub-arrays. However, it is fulfilled when identical elements are located at non-symmetric positions (such as position 5 and 12 in an array having only positions 1-12).

Furthermore, the assumption is fulfilled with a source array comprising three identical sub-arrays, because the pressure field measured by hydrophones on the central sub-array will be different from the pressure field measured by hydrophones on the outer sub-arrays. The assumption is also fulfilled with a source array comprising more than three identical sub-arrays, because the pressure field measured by hydrophones on the outer sub-arrays will differ from the pressure field measured by hydrophones on the inner sub-arrays.

It should be noted that two nominally identical sources that are used in the method of the invention should be at approximately the same depth. In the case of airguns as the sources, it is well-known that the period of the oscillating airgun bubble decreases with increasing depth, since two airguns deployed at different depths experience different hydrostatic pressures to one another. Thus, two identical airguns deployed at substantially different depths violate the fundamental assumption behind the present invention, as their notional source signature will be different from one another. However, in the case of independently towed source sub-arrays, it is likely that winds, current and tide will cause much greater variations from the nominal source positions in the x- and y-directions than in depth.

It should also be noted that the present invention provides an estimate of the relative source geometry, in that it provides an estimate of the position of each source relative to the positions of the other sources. The invention does not however provide information about the heading of the source array—in the example of FIG. 5(a), the invention can provide information on the relative position of each source, but cannot provide information about the heading of the sub-arrays (where the "heading" of a source array is the direction of the source array in the x-y plane). Information about the heading may be obtained from, for example, GPS sensors located on the source array.

The sets of estimates of the source positions used in the various repetitions of steps 2, 3 and 4 may be chosen using any suitable method. For example, each set of estimates may be obtained a perturbation to the nominal source geometry. The perturbations that are used may for example be chosen randomly, or they may be chosen according to some systematic method. As an example of a systematic method, the relative positions of the sub-arrays of the source array of FIG. 1(a) or 4(a) may be characterised by six parameters (ignoring variations in depth)—the angle between the left sub-array and the central sub-array, the angle between the right sub-array and the central sub-array, a lateral spacing between the midpoint of the left sub-array and the midpoint of the central sub-array, a lateral spacing between the midpoint of the right sub-array and the midpoint of the central sub-array, a longitudinal spacing between the midpoint of the left sub-array and the midpoint of the central sub-array, and a longitudinal spacing between the midpoint of the right sub-array and the midpoint of the central sub-array. Ranges may be defined for each of these parameters, and the method may be effect by varying the parameters through their respective ranges. There may be constraints on the positions of the sources in the array arising from the physical construction of the array. For example, the distance between two particular sources may be fixed, or may be constrained to be less than a maximum value. Any such constraints are preferably taken into account when choosing estimates of the source positions.

The method of FIG. 6 may be performed for every actuation of the source array. Although this requires more computation, re-determining the estimates of the positions of the sources for every shot should provide the most accurate estimates of the notional signatures of the sources for every shot.

Alternatively, the method of FIG. 6 may be performed at intervals, for example after every m actuations of the source array. This reduces the computation required, while allowing the estimates of the positions of the sources to be up-dated. This may be done, for example, in calm sea conditions, where there is likely to be little relative movement between the sub-arrays.

The invention has been described above with reference to an embodiment in which the number of pressure measurements is equal to the number of sources. The invention is not however limited to this and in general the number of independent pressure measurements (denoted hereinafter by "M") is not required to be the same as the number of sources N. In principle, the method of the invention may be applied if the number of independent pressure measurements satisfies $M > N_{unique}$, wherein the source array includes at least $N_{unique}$ types of sources that are nominally non-identical to one another. The invention requires that at least two sources of the array are nominally identical to one another so that $1 \leq N_{unique} \leq N-1$.

Figure 8:
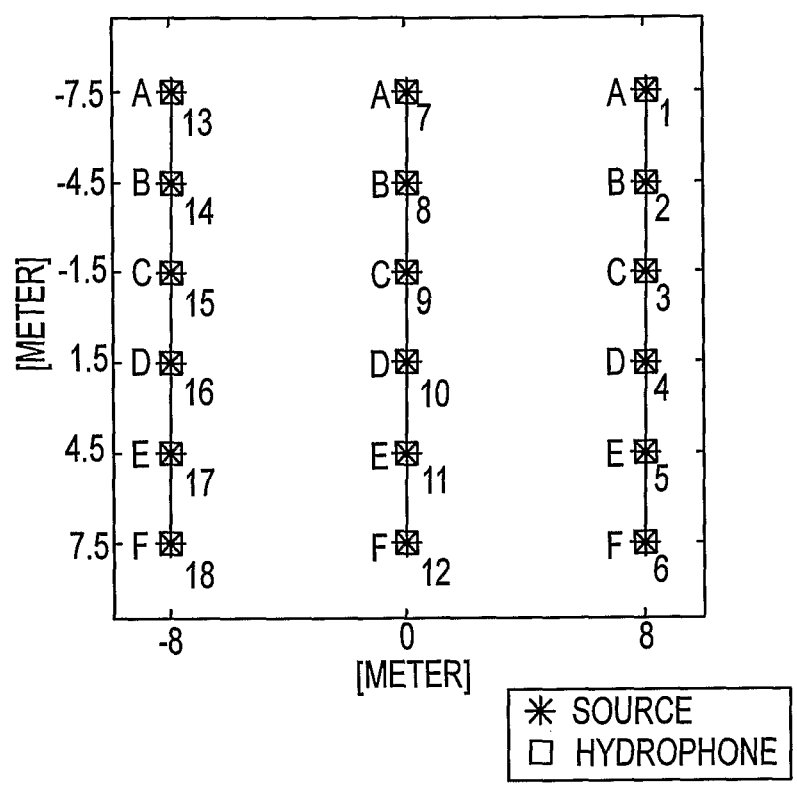
FIG. 8 is a schematic illustration of an array to which a method of a further embodiment of the invention may be applied.

FIG. 8 shows the nominal layout of a WesternGeco™ standard source array, where the source comprises three identical sub-arrays. The array comprises a total of N=18 sources of which $N_{unique}$=6 are nominally non-identical. These six unique source types are identified in FIG. 8 with the letters A, B, C, D, E, and F. The array further comprises M=18 hydrophones, with one hydrophone located in the vicinity of each source. This therefore corresponds to the case: $M=N>N_{unique}$. Sources are denoted using an *, and hydrophones are denoted using a □.

Information about the positions of the sources of the array may be obtained by a method generally as described above with reference to FIG. 6. At step 2 in the method of FIG. 6, the notional source signature of each of the sources in position 1 to 18 is calculated in the standard way, for example using the method of U.S. Pat. No. 4,476,553 or GB Patent No. 2 433 594.

At step 3 in the flow diagram of FIG. 6, the signatures of each instance (or at least of two instances) of a unique source type are compared, and a quantitative measure of the signature difference of each pair is obtained. As an example, this may comprise computing the NRMS difference of the signatures for sources in positions 1 and 7, for, sources in positions 7 and 13, and for sources in positions 1 and 13 for source type A. This may be repeated for each source type, for example for sources in positions 2 and 8, for sources in positions 8 and 14, and for sources in positions 2 and 14 for source type B and so on.

Step 4 of the method of FIG. 6 may then be applied as described above.

Figure 9:
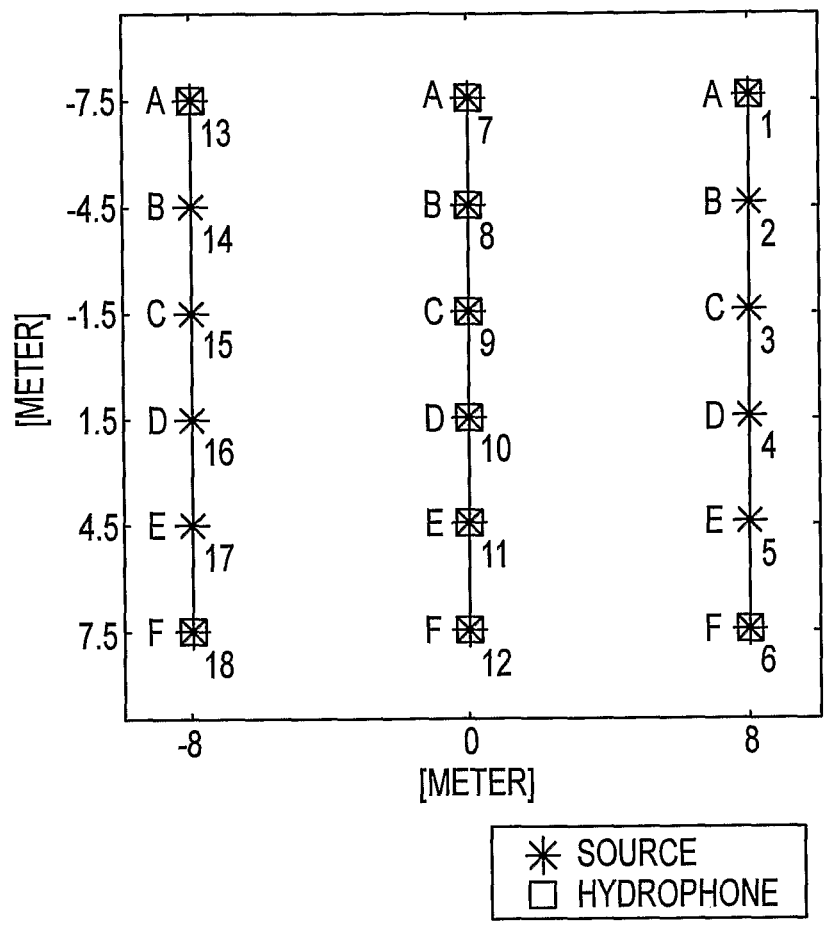
FIG. 9 is a schematic illustration of an array to which a method of a further embodiment of the invention may be applied.

FIG. 9 shows the nominal layout of a similar array layout as in FIG. 8, but with the hydrophones at position 2, 3, 4, 5, 14, 15, 16, and 17 removed. In this case the array only has M=10 hydrophones, whereas the array still has a total of N=18 sources of which $N_{unique}$=6 are nominally non-identical. These six unique source types are identified with the letters A, B, C, D, E, and F. This therefore corresponds to the case: $N>M>N_{unique}$.

Information about the positions of the sources of the array may be obtained by a method generally as described above with reference to FIG. 6. At step 2 in the method of FIG. 6, the notional source signature of each of the sources in position 1 to 18 is calculated in a standard way, for example using the method of U.S. Pat. No. 4,476,553 or GB 2 433 594, but with an additional constraint; the notional source signature from a source position without an associated hydrophone is assumed to be identical to the unique counterpart that has a hydrophone in the vicinity. For example, when calculating the notional source signature of source type A at position 13, the signal emitted by source type B at position 14, into hydrophone 13, is assumed to be identical to the signal radiating from source type B at position 8.

At step 3 in the flow diagram of FIG. 6, the notional signatures of each instance of (or of at least two instances of) a unique source type are compared, and a quantitative measure of the signature difference of each pair is obtained. However, this comparison should be limited to source positions with a hydrophone in the vicinity, in order to exclude source signatures that have already been assumed to be identical. For example, since the signal emitted by source type B at position 14 has been assumed to be identical to the signal radiating from source type B at position 8, the sources as positions 8 and 14 should be excluded from the comparison. In the specific example of FIG. 9, only signature pairs (1 and 7), (7 and 13), (1 and 13), (6 and 12), (12 and 18), and (6 and 18) should be used in the comparison.

Step 4 of the method of FIG. 6 may then be applied as described above.

Figure 10:
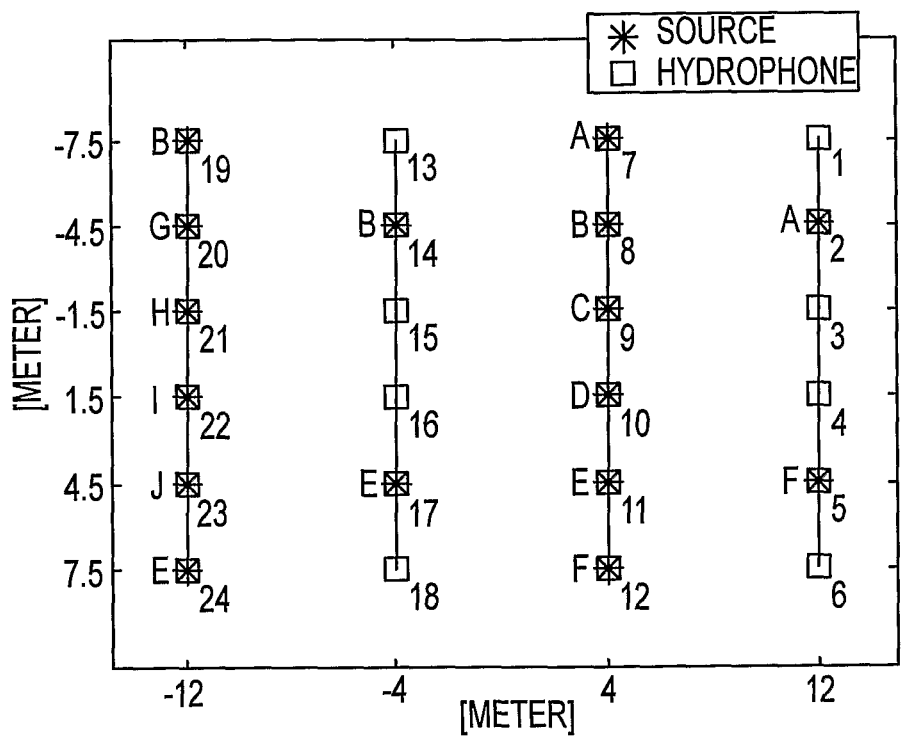
FIG. 10 is a schematic illustration of an array to which a method of a further embodiment of the invention may be applied.

FIG. 10 shows a layout of a source array comprising four sub-arrays. The array comprises a total of N=16 sources of which $N_{unique}$=10 are nominally non-identical. These ten unique source types are identified with the letters A, B, C, D, E, F, G, H, I, and J. The array further comprises M=24 hydrophones, wherein at least one hydrophone is located in the vicinity of each source. This therefore corresponds to the case: $M>N>N_{unique}$.

Information about the positions of the sources of the array may be obtained by a method generally as described above with reference to FIG. 6. At step 2 in the method of FIG. 6, the notional source signature of each of the 16 sources can be calculated in the standard way, for example using the method of U.S. Pat. No. 4,476,553 or GB 2 433 594, by assigning one local hydrophone to each of the 16 sources. However, the (M−N) additional hydrophones ((M−N)=8 in the example of FIG. 10) can be used to solve the over-determined notional source equation set, which can be used to improve the accuracy of the calculated notional source signatures. One, simple, intuitive way to do this is as follows: Each of the "free" hydrophones are assigned to the closest source position, e.g. hydrophone 1 and 3 are assigned to source 2, in addition to hydrophone 2, similarly, hydrophone 4 and 6 are assigned to source 5. This results in three estimates of the signature of source A in position 2, and similarly, three estimates of the signature of source F in position 5. The additional signatures are also calculated in the standard way, for example. using the method of U.S. Pat. No. 4,476,553 or GB 2 433 594.

Before step 3 in the flow diagram of FIG. 6, the redundant notional source signatures can be combined into one signature estimate with increased accuracy, or as described below, each estimate can be used in the signature comparison of identical source types.

At step 3 in the flow diagram of FIG. 6, the signatures of each instance of (or of at least two instances of) a unique source type are compared, and a quantitative measure of the signature difference of each pair is obtained. In the specific example of FIG. 10, this may include the following signature pairs derived from the hydrophone measurements:

Type A: (2,7), (1,7), (3,7)
Type F: (5,12), (4,12), (6,12)
Type B: (8,14), (14,19), (8,19), (8,13), (8,15), (13,19), (15, 19)
Type E: (11,17), (17,24), (11,24), (11, 16), (11,18), (16,24), (18,24)

Step 4 of the method of FIG. 6 may then be applied as described above.

Figure 11:
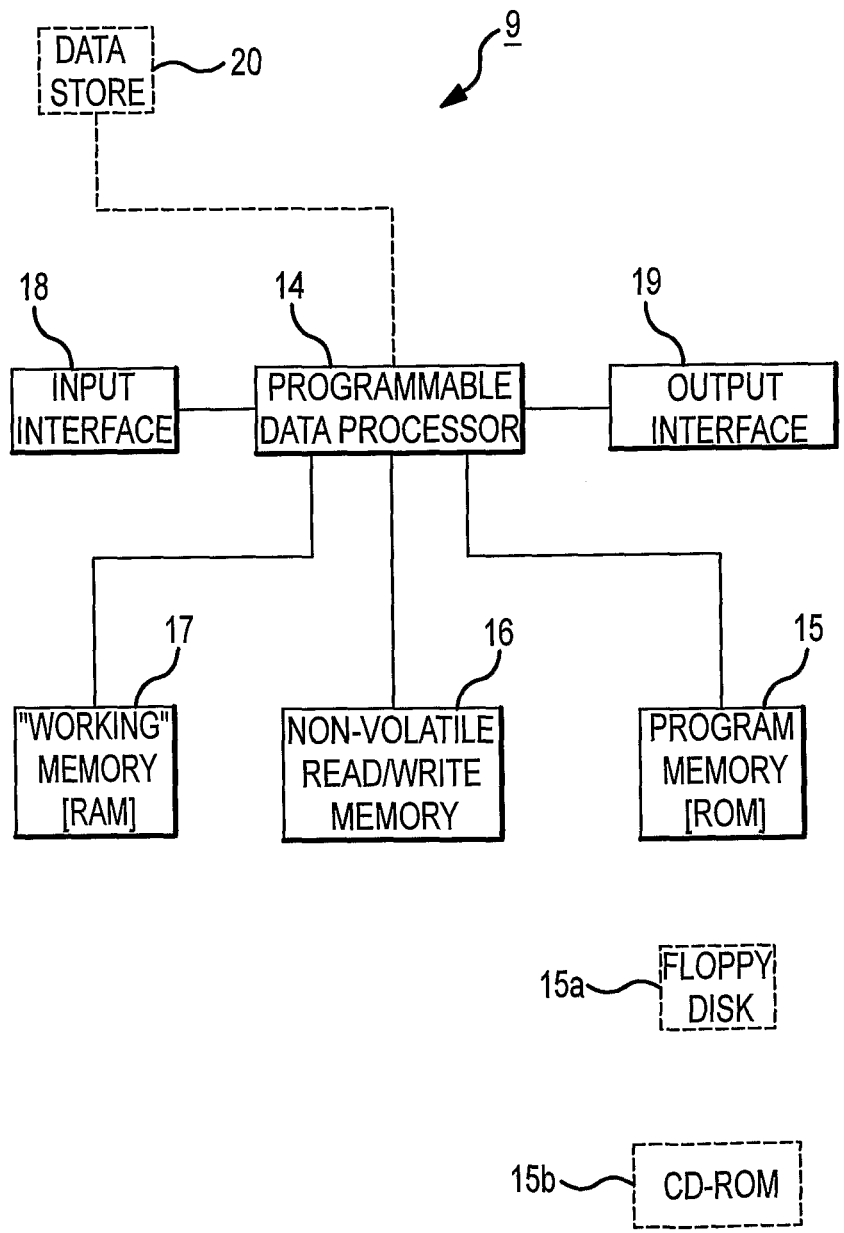
FIG. 11 is a schematic block diagram of an apparatus of the present invention.

FIG. 11 is a schematic block diagram of a programmable apparatus 13 according to the present invention. The apparatus comprises a programmable data process 14 with a program memory 15, for instance in the form of a read-only memory (ROM), storing a program for controlling the data processor 14 to perform any of the processing methods described above. The apparatus further comprises non-volatile read/write memory 16 for storing, for example, any data which must be retained in the absence of power supply. A "working" or scratch pad memory for the data processor is provided by a random access memory (RAM) 17. An input interface 18 is provided, for instance for receiving commands and data. An output interface 19 is provided, for instance for displaying information relating to the progress and result of the method. Seismic data for processing may be supplied via the input interface 19, or may alternatively be retrieved from a machine-readable data store 20.

The program for operating the system and for performing a method as described hereinbefore is stored in the program memory 15, which may be embodied as a semi-conductor memory, for instance of the well-known ROM type. However, the program may be stored in any other suitable storage medium, such as magnetic data carrier 15a, such as a "floppy disk" or CD-ROM 15b.

The invention claimed is:

1. A method of obtaining information about positions of seismic sources in a marine seismic source array comprising N seismic sources, wherein the marine seismic source array includes at least Nunique types of seismic sources that are nominally non-identical to one another, where 1≤Nunique≤N−2, the method comprising:
   measuring the pressure field at M locations of the N seismic sources, where M>Nunique;
   obtaining information about relative positions of the seismic sources in the marine seismic source array from the M pressure measurements and from a constraint that at least two of the seismic sources are nominally identical to one another, wherein obtaining information about the relative positions of the seismic sources comprises determining, on the basis of a first set of estimates of the relative positions of the seismic sources, respective notional signatures for at least first and second seismic sources that are nominally identical to one another from the M measurements of the pressure field;
   comparing the notional signature of the first seismic source with the notional signature of the second seismic source, wherein the seismic sources are airguns and comparing the notional signature of the first seismic source with the notional signature of the second seismic source comprises comparing the notional signature of the first seismic source with the notional signature of the seismic second source within a time window that excludes the first bubble peak of the notional signature of the first seismic source and the first bubble peak of the notional signature of the second seismic source;
   generating a measure indicative of a difference between the notional signature of the first seismic source and the notional signature of the second seismic source;
   comparing the generated measure with a predetermined threshold; and
   if the generated measure is greater than the predetermined threshold, calculating respective notional signatures for at least the first and second seismic sources on the basis of a second set of estimates of the relative positions of the seismic sources that is different from the first set of estimates of the relative positions of the seismic sources.

2. A method as claimed in claim 1 wherein M=N.

3. A method as claimed in claim 1 wherein N>M.

4. A method as claimed in claim 1 wherein N<M.

5. A method as claimed in claim 1 wherein obtaining information about the relative positions of the seismic sources comprises solving a set of Nunique equations.

6. A method as claimed in claim 1 wherein the first seismic source and the second seismic source are nominally deployed at the same depth as one another.

7. A method as claimed in claim 1 and further comprising:
   generating an output at one or more of the seismic sources of the array; and
   measuring the pressure field at the M independent locations.

8. A method as claimed in claim 1, and comprising time-aligning the notional signature of the first source with the notional signature of the second source before comparing the notional signature of the first source with the notional signature of the second source.

9. A method as claimed in claim 1 and comprising accepting the first set of estimates of the relative positions of the seismic sources if the generated measure is less than the predetermined threshold.

10. A method as claimed in claim 1 wherein the first set of estimates of the positions of the seismic sources is obtained by perturbing the nominal positions of the seismic sources.

11. A method as claimed in claim 7, and further comprising:
   acquiring seismic data at one or more seismic receivers consequent to generating the output at one or more of the sources of the seismic source array; and
   processing the acquired seismic data to obtain information about one or more parameters of the earth's interior.

12. A method as claimed in claim 11 wherein processing the seismic data to obtain information about one or more parameters of the earth's interior comprises taking account of the determined notional signatures for the sources of the source array.

* * * * *